United States Patent
Park et al.

(10) Patent No.: US 11,168,430 B2
(45) Date of Patent: Nov. 9, 2021

(54) WASHING MACHINE

(71) Applicant: LG ELECTRONICS INC., Seoul (KR)

(72) Inventors: Sooyong Park, Seoul (KR); Kyunghwan Kim, Seoul (KR); Hwanyong Kim, Seoul (KR); Seonghun Lee, Seoul (KR); Byungsang Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 141 days.

(21) Appl. No.: 16/626,096

(22) PCT Filed: Jun. 21, 2018

(86) PCT No.: PCT/KR2018/006993
§ 371 (c)(1),
(2) Date: Dec. 23, 2019

(87) PCT Pub. No.: WO2018/236155
PCT Pub. Date: Dec. 27, 2018

(65) Prior Publication Data
US 2020/0208325 A1    Jul. 2, 2020

(30) Foreign Application Priority Data
Jun. 21, 2017 (KR) .................. 10-2017-0078772

(51) Int. Cl.
*D06F 34/08* (2020.01)
*D06F 37/30* (2020.01)
*D06F 37/04* (2006.01)
*D06F 37/26* (2006.01)

(52) U.S. Cl.
CPC ............ *D06F 37/304* (2013.01); *D06F 37/04* (2013.01); *D06F 37/26* (2013.01)

(58) Field of Classification Search
CPC ....................................................... D06F 34/08
See application file for complete search history.

(56) References Cited

U.S. PATENT DOCUMENTS

2007/0006618 A1    1/2007   Choi et al.

FOREIGN PATENT DOCUMENTS

| EP | 2 604 740 A1 | 6/2013 |
|---|---|---|
| KR | 10-2005-0010365 A | 1/2005 |
| KR | 10-2007-0028041 A | 3/2007 |
| KR | 10-2012-0070763 A | 7/2012 |
| KR | 10-2013-0114482 A | 10/2013 |

*Primary Examiner* — Jason Y Ko
(74) *Attorney, Agent, or Firm* — Birch, Stewart, Kolasch & Birch, LLP

(57) ABSTRACT

Disclosed is a washing machine comprising: a tub which accommodates washing water; a drum which is disposed inside the tub, accommodates cloth, and is rotatable; a transmission coil which is disposed in the tub and supplies power wirelessly; a reception coil which is disposed in the drum and receives the power transmitted from the transmission coil; and a washing force reinforcing unit which is disposed in the drum, operated by the power delivered from the reception coil, and provides washing force to the cloth.

15 Claims, 12 Drawing Sheets

WASHING MACHINE

CROSS REFERENCE TO RELATED APPLICATIONS

This application is the National Phase of PCT International Application No. PCT/KR2018/006993, filed on Jun. 21, 2018, which claims priority under 35 U.S.C. 119(a) to Patent Application No. 10-2017-0078772, filed in the Republic of Korea on Jun. 21, 2017, all of which are hereby expressly incorporated by reference into the present application.

TECHNICAL FIELD

The present invention relates to a washing machine, and more particularly, to a configuration of a separate washing unit in a drum to increase washing force.

BACKGROUND ART

Generally, a washing machine is an apparatus that performs cleaning through processes of washing, rinsing, dehydration, and the like to remove contamination on clothes, bedding, and the like (hereinafter, referred to as 'cloth') by using water, detergent, and mechanical action.

Washing machines are classified into agitator type, pulsator type, and drum type washing machines.

The agitator type washing machine performs washing by rotating a laundry rod towering in the center of a washing tub from side to side, the pulsator type washing machine performs washing using frictional force between the water flow and the cloth by rotating a disk-shaped rotary blades formed in the lower portion of the washing tub from side to side, and the drum type performs washing by rotating a drum after water, detergent and cloth are loaded into the drum.

The drum washing machine is equipped with a tub, in which washing water is accommodated, formed in a cabinet forming an outer shape, a drum, in which cloth is accommodated, is disposed inside the tub, a motor for rotating the drum is mounted in the rear side of the tub, and a drive shaft is formed through the tub and connected to the rear side of the drum. A lifter is mounted in the inside of the drum and raises cloth when the drum rotates.

A general drum washing machine provides a physical washing force by a drop force generated as cloth lifted by the lifter falls to the bottom of an inner tub when the inner tub rotates, but there is a disadvantage of weak washing force.

In order to solve this problem, as in Patent Document 1, a technology for improving washing power by disposing an inner tub, which rotates in a different direction from the drum, inside the drum has been developed. However, there is a disadvantage in that it is difficult to manufacture a configuration for re-disposing the rotatable inner tub inside the drum, the manufacturing cost is increased, and it is difficult to configure a drive unit for supplying rotational force.

In addition, even if a separate laundry system is disposed inside the drum, there is a problem in that it is difficult to efficiently supply power to the rotating drum.

PRIOR ART DOCUMENT

[Patent Document]
Korean Registered Patent KR0443714B1

DISCLOSURE

Technical Problem

The present invention has been made in view of the above problems, and provides a washing machine to enhance washing force by transmitting power to the inside of a rotating inner tub.

The present invention further provides a washing machine that efficiently operates a washing force reinforcing unit disposed in a rotating inner tub without a separate control.

The objects of the present invention are not limited to the above-mentioned objects, and other objects not mentioned will be clearly understood by those skilled in the art from the following description.

Technical Solution

In an aspect, there is provided a washing machine, including: a transmission coil which is disposed in the tub and supplies power wirelessly; a reception coil which is disposed in the drum and receives the power transmitted from the transmission coil; and a washing force reinforcing unit which is disposed in the drum, operated by the power delivered from the reception coil, and provides washing force to the cloth.

In addition, the washing force reinforcing unit is operated, when at least a portion of the transmission coil and the reception coil is overlapped in one direction during rotation of the drum. In this case, the washing force reinforcing unit is positioned in a lower area of the drum, thereby achieving an effective washing.

Specific details of other embodiments are included in the detailed description and the drawings.

Advantageous Effects

According to the washing machine of the present invention has one or more of the following effects.

First, there is an advantage of efficiently providing power to a system disposed in a rotating drum by disposing a transmission coil in a tub and disposing a reception coil in a drum.

Second, there is an advantage that the manufacturing cost is reduced, manufacturing is easy, and the waterproof is improved, by disposing a transmission coil in a tub and disposing a reception coil in a drum.

Third, since the washing force reinforcing unit is operated only when it is positioned in the lower area of the drum, there is an advantage in that the falling cloth can be effectively washed, and energy can be saved.

Fourth, since there is no need to sense the position of the washing force reinforcing unit, and no separate control is required, there is an advantage of mitigating the control load of the washing machine.

The effects of the present invention are not limited to the above-mentioned effects, and other effects not mentioned will be clearly understood by those skilled in the art from the description of the claims.

MODE FOR INVENTION

Figure 1:
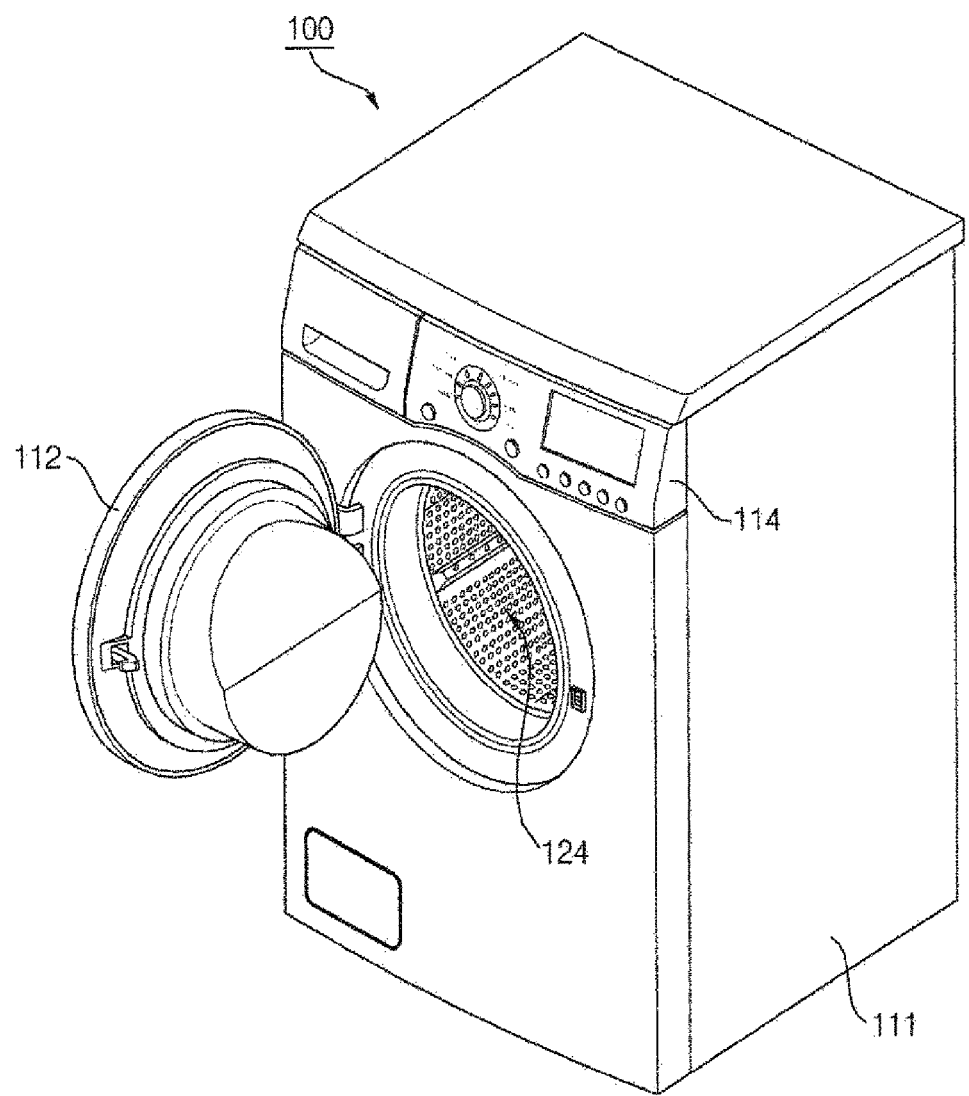
FIG. 1 is a perspective view of a washing machine according to an embodiment of the present invention.

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

The terms spatially relative, "below", "beneath", "lower", "above" and "upper" and the like can be used to easily describe the correlation of elements with other elements. Spatially relative terms should be understood in terms of the directions shown in the drawings, including the different directions of components at the time of use or operation. For example, when inverting an element shown in the drawings, an element described as "below" or "beneath" of another element may be placed "above" of another element. Thus, the exemplary term "below" may include both downward and upward directions. The elements may also be oriented in a different direction, so that spatially relative terms can be interpreted according to orientation.

The terminology used herein is for the purpose of illustrating embodiments and is not intended to restrict the invention. In this specification, singular forms include plural forms unless the context clearly dictates otherwise. It is noted that the terms "comprises" and/or "comprising" used in the specification mean that mentioned elements, steps, and/or operations do not exclude the presence or addition of one or more of other elements, steps, and/or operations.

Unless defined otherwise, all terms (including technical and scientific terms) used herein may be used in a sense commonly understood by a person having ordinary skill in the art to which the claimed invention pertains. In addition, commonly used predefined terms are not ideally or excessively interpreted unless explicitly defined otherwise.

In the drawings, the thicknesses and sizes of respective elements are exaggerated, omitted, or schematically shown for convenience and clarity of explanation. In addition, the size and area of each element do not entirely reflect actual size or area.

Further, the angles and directions mentioned in the process of describing the structure of the embodiment are based on those shown in the drawings. In the description of the structure that constitutes an embodiment in the specification, when a reference point and a positional relationship with respect to angle are not explicitly referred to, reference is made to the relevant drawings.

Figure 2:
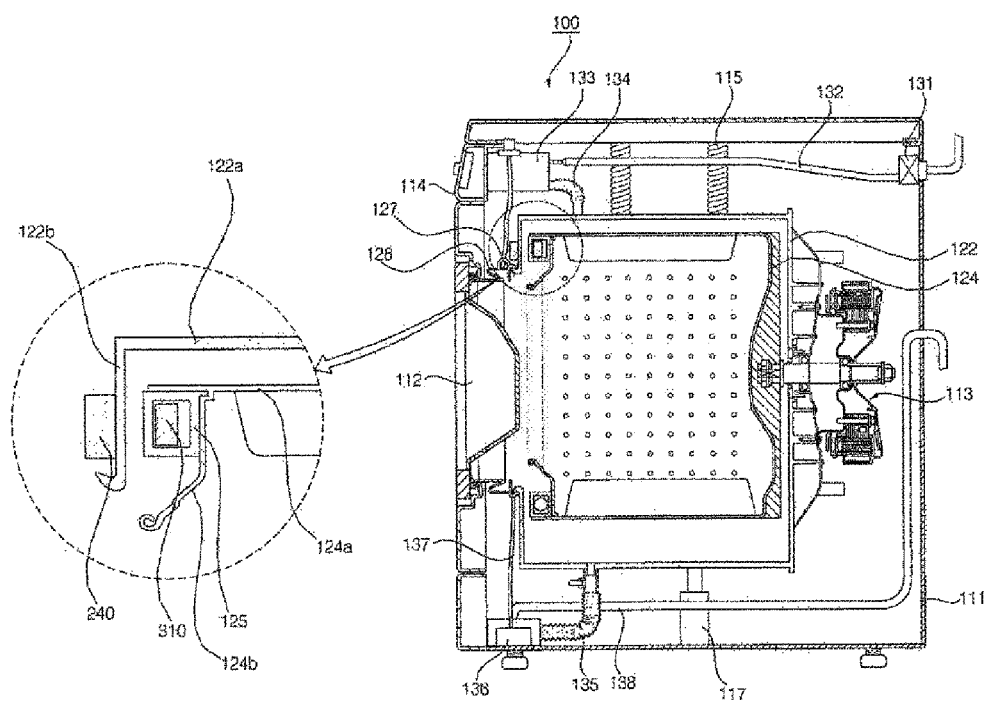
FIG. 2 is a cross-sectional view of a washing machine according to an embodiment of the present invention.
Figure 3:
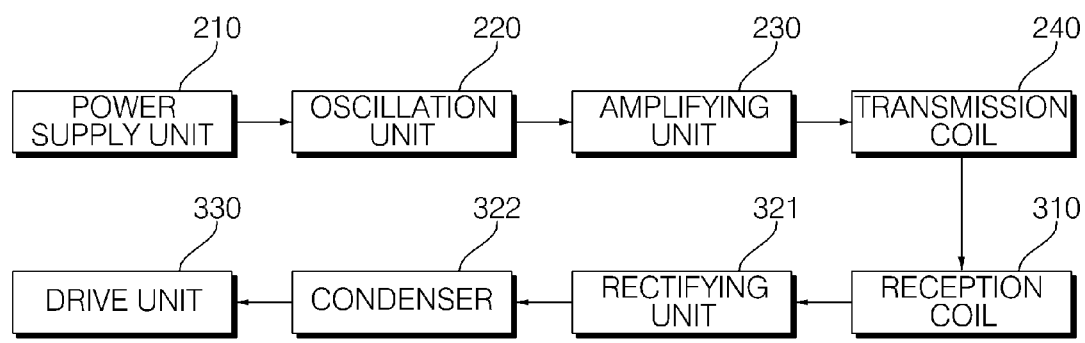
FIG. 3 is a block diagram of the washing machine shown in FIG. 1.
Figure 4:
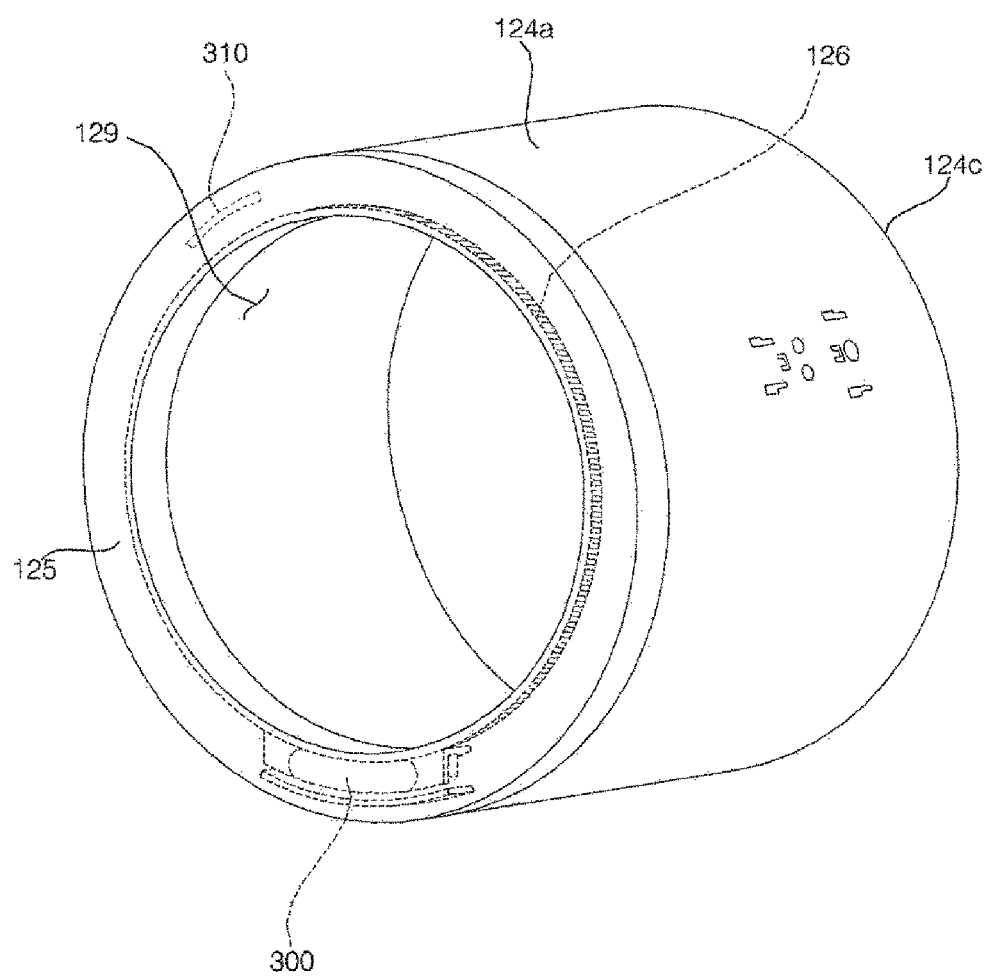
FIG. 4 is a perspective view of a drum of the washing machine shown in FIG. 1.
Figure 5:
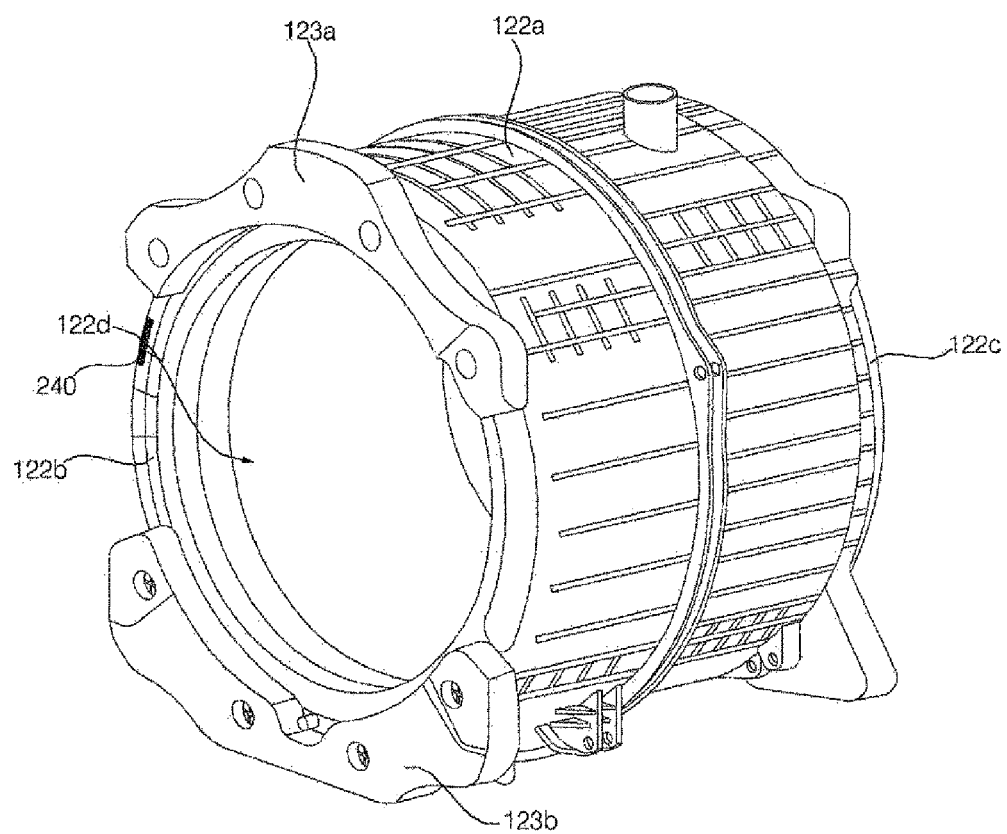
FIG. 5 is a perspective view of a tub of the washing machine shown in FIG. 1.

FIG. 1 is a perspective view of a washing machine according to an embodiment of the present invention, FIG. 2 is a cross-sectional view of a washing machine according to an embodiment of the present invention, FIG. 3 is a block diagram of the washing machine shown in FIG. 1, FIG. 4 is a perspective view of a drum of the washing machine shown in FIG. 1, and FIG. 5 is a perspective view of a tub of the washing machine shown in FIG. 1.

A washing machine 100 according to an embodiment of the present invention includes a cabinet 111 forming an outer shape, a door 112 which opens and closes one side of the cabinet to allow cloth to enter and exit the cabinet, a tub 122 which is disposed inside the cabinet and supported by the cabinet, a drum 124 which is disposed inside the tub 122 and rotated with a cloth inserted therein, a drum motor 113 which applies torque to the drum 124 and rotates the drum 124, a detergent box 133 which accommodates detergent, and a control panel 114 which receives user input and displays a washing machine state.

In addition, the washing machine 100 according to an embodiment of the present invention provides a tub 122, a drum 124, a transmission coil 240, a reception coil 310, and a washing force reinforcing unit 40.

The cabinet 111 has a cloth load hole 111a formed to allow cloth to enter and exit. The door 112 is rotatably coupled to the cabinet 111 and allows the opening and closing of the cloth load hole 111a. The cabinet 111 is provided with a control panel 114. The cabinet 111 is provided with a detergent box 133 to be withdrawn.

The tub 122 is disposed inside the cabinet 111 to be buffered by a spring 115 and a damper 117. The tub 122 accommodates washing water. The tub 122 is disposed in the outside of the drum 124 while surrounding the drum 124.

The tub 122 includes a cylindrical tub body 122a having both sides opened, a ring-shaped front tub cover 122b disposed in an opened front side of the tub body 122a, and a disk-shaped rear tub cover 122c disposed in an opened rear side of the tub body 122a. Hereinafter, the front side means the door 112 side, the rear side means the drum motor 113 side.

A tub hole 122d is formed in one side of the tub 122. The tub hole 122d is formed to communicate with the cloth load hole 111a so that cloth can enter and exit the drum 124. The tub hole 122d is formed in the front tub cover 122b.

A weight 123 is coupled to a portion of the edge of one side of the tub 122. The weight 123 applies a load to the tub 122. The weight 123 is preferably disposed around the tub hole 122d. It is preferable that a plurality of weights 123 are provided and disposed in upper and lower sides of the front tub cover 122b.

The plurality of weights 123 includes an upper weight 123a disposed above the front tub cover 122b and a lower weight 123b disposed below the front tub cover 122b. The upper weight 123a is disposed above the tub hole 122d among the edges of the tub 122, and the lower weight 123b is disposed below the tub hole 122d among the edges of the tub 122.

The transmission coil 240 described later may be disposed in the edge of one side of the tub 122. The transmission coil 240 wirelessly supplies power to the washing force reinforcing unit 40.

The drum motor 113 generates a rotational force. The drum motor 113 may rotate the drum 124 at various speeds or directions. The drum motor 113 includes a stator (not shown) in which coil is wound, and a rotor (not shown) that rotates by generating electromagnetic interaction with the coil.

The drum 124 accommodates cloth and rotates. The drum 124 is disposed inside the tub 122. The drum 124 is formed in a rotatable cylindrical shape. The drum 124 is provided with a plurality of through holes so that washing water can pass through. The drum 124 receives the rotational force of the drum motor 113 and rotates. The rotation shaft of the drum 124 is disposed horizontally with the ground.

A drum hole 129 is formed in the front side of the drum 124. The drum hole 129 is formed to communicate with the cloth load hole 111a and the tub hole 122d to allow cloth to enter and exit the drum 124.

The drum 124 includes a cylindrical drum body 124a having both sides opened, a ring-shaped front drum cover 124b disposed in an opened front side of the drum body 124a, and a disk-shaped rear drum cover 124c disposed in an opened rear side of the drum body 124a, 122a.

One or more lifters 151 may be provided along the inner circumferential surface of the drum 124 so that laundry may be lifted and dropped according to the rotation of the drum 124.

A guide rail 125 is coupled to the edge of one side of the drum 124. The guide rail 125 is a passage through which a balancing unit 300 passes. The guide rail 125 has a rectangular cross section, and the balancing unit 300 is disposed inside the guide rail 125.

The guide rail 125 is formed in a ring shape and is provided in the front side and/or rear side of the drum 124. In the present embodiment, the guide rail 125 is coupled to the front edge of the drum 124. The guide rail 125 is preferably disposed around the drum hole 129.

A gasket 128 seals between the tub 122 and the cabinet 111. The gasket 128 is disposed between an opening of the tub 122 and the cloth load hole 111a. The gasket 128 mitigates the shock transmitted to the door 112 when the drum 124 rotates while preventing the washing water in the tub 122 from leaking to the outside. The gasket 128 may be provided with a circulation nozzle 127 for introducing washing water into the drum 124.

The detergent box 133 accommodates a detergent such as laundry detergent, cloth softener, or bleaching agent. The detergent box 133 is preferably provided in the front surface of the cabinet 111 to be pulled out. The detergent in the detergent box 133 is mixed with the washing water and introduced into the tub 122 when washing water is supplied.

It is preferable that a water supply valve 131 for controlling the inflow of the washing water from an external water source, a water supply flow path 132 through which the washing water introduced into the water supply valve flows into the detergent box 133, and a water supply pipe 134 for introducing washing water mixed with detergent in the detergent box 133 into the tub 122 are provided inside the cabinet 111.

It is preferable that a drain pipe 135 through which washing water in the tub 122 is discharged, a pump 136 for discharging the washing water in the tub 122, a circulation flow path 137 for circulating the washing water, a circulation nozzle 127 for introducing washing water into the drum 124, and a drain flow path 138 through which washing water is drained to the outside are provided inside the cabinet 111. According to an embodiment, the pump 136 may be provided as a circulation pump and a drain pump, and may be connected to the circulation flow path 137 and the drain flow path 138, respectively.

The balancing unit 300 moves along the edge of the drum 124 and changes the center of gravity of the drum 124. In this case, the center of gravity of the drum 124 does not mean the center of gravity of the drum 124 itself, but means a common center of gravity of objects including the cloth, which is accommodated in the drum 124, that rotates with the drum 124 when the drum 124 rotates, the guide rail 125, the balancing unit 300, and other components attached to drum 124.

The balancing unit 300 moves along the circumferential direction of the drum 124 to adjust the center of gravity of the drum 124 when the cloth is eccentric. When the drum 124 rotates while the cloth is eccentric, vibration and noise are generated due to unbalance that the geometric center of a rotation shaft 116 itself and the actual center of gravity of the drum 124 are inconsistent. The balancing unit 300 reduces the unbalance of the drum 124 by bringing the center of gravity of the drum 124 close to the rotation shaft 116. A plurality of balancing units 300 may be provided.

The balancing unit 300 may be provided in the front side and/or rear side of the drum 124, and in the present embodiment, the balancing unit 300 is provided in the front side of the drum 124. When the drum 124 is rotated, the cloth accommodated in the drum 124 is generally collected in the inner side of the drum 124, i.e., in the rear side. Accordingly, it is preferable that the balancing unit 300 is provided in the front side of the drum 124 so as to be balanced with the cloth collected in the rear side of the drum 124. The balancing unit 300 moves along the guide rail 125 provided in the edge of the drum 124.

The balancing unit 300 moves actively or passively according to the rotational speed of the drum 124. Active movement means that the balancing unit 300 moves along the guide rail 125 by its own power, and passive movement means that the balancing unit 300 moves along the guide rail 125 by centrifugal force. When the balancing unit 300 actively moves, it can actively change the center of gravity of the drum 124 by moving to a specific position or moving at a specific speed.

The control panel 114 includes an input unit (not shown) for receiving various operation commands such as a washing course selection, an operation time and reservation for each process, and the like through a user, and a display unit (not shown) for displaying the operation state of the washing machine 100.

Referring to FIG. 2, the washing machine according to an embodiment of the present invention includes a power supply unit 210 for supplying power from the outside, an oscillation unit 220 for generating a voltage fluctuation width in the power supplied from the power supply unit 210, an amplifying unit 230 for amplifying the power, a transmission coil 240 for generating a magnetic field, a reception coil 310 for generating power by electromagnetic induction from the magnetic field, a rectifying unit 321 for converting the power generated by the reception coil 310 to DC power, a condenser 322 for storing power, and a drive unit 330 for generating power.

The power supply unit 210 converts commercial power, which is AC supplied from the outside, into an appropriate power. In the present embodiment, the power supply unit is a switched-mode power supply to convert the commercial power to DC 14V. The power supply unit 210 may be provided in a certain position inside the cabinet 111 or in the control panel 114. Power converted and supplied by the power supply unit 210 may be also supplied to the drum motor 113.

The oscillation unit 220 is an oscillator, and generates a voltage fluctuation width in the power supplied from the power supply unit 210 so that a magnetic field is generated in the transmission coil 240. The amplifying unit 230 amplifies power so that the transmission coil 240 can obtain a sufficient current.

The transmission coil 240 generates a magnetic field, and the reception coil 310 generates power by electromagnetic induction from the magnetic field which is generated by the transmission coil 240.

The rectifying unit 321 converts the power generated in the reception coil 310 into DC power. An adjusting unit 322 adjusts the power rectified by the rectifying unit 321 to a constant voltage and current.

The condenser 322 is disposed in the drum 124 to store the power received from the reception coil 310. The condenser 322 may be configured of a capacitor or a battery. Preferably, the condenser 322 may be disposed in a printed circuit board together with the reception coil 310.

The drive unit 330 generates power from the power stored in the condenser 322 or/and the power adjusted in the rectifying unit 321. The drive unit 330 is supplied from the outside to generate power from the power transmitted wirelessly through the transmission coil 240 and the reception coil 310.

The above-mentioned oscillation unit 220 and amplifying unit 230 are preferably provided in a certain position inside the cabinet 111 or in the control panel 114, and the reception coil 310, the rectifying unit 321, the condenser 322, and the drive unit 330 are preferably provided in the drum 124.

Referring again to FIG. 5, the disposition with the transmission coil 240 will be described in detail.

The reception coil 310 is disposed in a corresponding position of the transmission coil 240. The transmission coil 240 and the reception coil 310 preferably maintain a distance in which wireless transmission can be achieved from each other within a certain distance. The distance between the transmission coil 240 and the reception coil 310 is preferably within 30 mm. More preferably, the distance between the transmission coil 240 and the reception coil 310 ranges from 10 mm to 20 mm.

For example, the transmission coil 240 may be disposed to be continuously spaced apart from the reception coil 310 within a certain distance during the rotation of the drum 124, or the transmission coil 240 may be disposed to be spaced apart from the reception coil 310 within a certain distance in a partial section during the rotation of the drum 124.

For example, the transmission coil 240 may be disposed outside the drum 124. Specifically, the transmission coil 240 may be disposed inside or outside the tub 122, or may be disposed in the inner or outer surface of the tub 122. Obviously, the transmission coil 240 may be positioned inside the cabinet 111, or may be disposed in the inner surface of the cabinet 111.

As another example, the transmission coil 240 is disposed in the tub 122 in correspondence with the guide rail 125.

The transmission coil 240 may be formed in an arc shape and disposed in a portion of the edge of one side of the tub 122, or may be formed in a ring shape and disposed in the entire edge of one side of the tub 122.

When the transmission coil 240 is disposed in the entire edge of the tub 122 in the form of a ring, there is an advantage of transmitting power in the entire section during the rotation of the drum 124, but if the washing force reinforcing unit 40 does not continuously consume power, there is a problem that the manufacturing cost is increased, and interference occurs with the weight 123 disposed in the edge of one side of the tub 122.

Therefore, it is preferable that the transmission coil 240 is disposed in an arc shape on a part of the edge of one side of the tub 122.

Specifically, the transmission coil 240 may be disposed in the front tub cover 122b or the rear tub cover 122c. Since there is a risk of interference with the drum motor 113 in the rear tub cover 122c, the transmission coil 240 is preferably disposed around the tub hole 122d which is an edge of the front side of the tub 122.

In the present embodiment, the transmission coil 240 is disposed on the front tub cover 122b. The transmission coil 240 is preferably disposed in the front side of the front tub cover 122b so as to face the guide rail 125.

The tub 122 is preferably coupled to a coil cover (not shown) surrounding the transmission coil 240. A coil cover (not shown) is coupled to the front tub cover 122b to surround the transmission coil 240. The coil cover (not shown) protects the transmission coil 240 from water or foreign matter together with the front tub cover 122b.

The transmission coil 240 may be waterproofed by itself, but in order to maintain reliability, the transmission coil 240 may be disposed in the outer surface of the tub 122. In the embodiment, the transmission coil 240 is disposed in the outer surface (front surface) of the front tub cover 122b, thereby preventing the electrical short due to the washing water stored in the tub 122.

The transmission coil 240 is preferably disposed in an upper area of the tub 122.

The upper area of the tub 122 means an area positioned in an upper side of an area divided by an arbitrary plane passing through the central shaft of the tub 122 and horizontal to the ground. When the transmission coil 240 is positioned in the upper area of the tub 122, if the tub 122 is not completely filled with the washing water, the contact between the washing water and the transmission coil 240 can be blocked as much as possible.

The weight 123 is coupled to a portion of the edge of the drum 124. The transmission coil 240 may be preferably disposed in an area where the weight 123 is not disposed among the edges of one side of the tub 122. At this time, the transmission coil 240 is preferably formed in an arc shape.

A plurality of weights 123 may be provided and disposed in a portion of the upper and lower sides of the front tub cover 122b. A plurality of transmission coils 240 may be provided and disposed in both sides of the front tub cover 122b between the upper weight 123a and the lower weight 123b.

As another example, a plurality of weights 123 may be provided and disposed in a portion of the left and right sides of the front tub cover 122b. The transmission coil 240 may be disposed above the front tub cover 122b to reduce the probability of contact with the washing water.

Referring to FIG. 4 again, the disposition of the reception coil 310 will be described in detail.

The reception coil 310 is disposed in a corresponding position of the transmission coil 240.

The reception coil 310 and the transmission coil 240 preferably maintain a distance in which wireless transmission can be achieved from each other within a certain distance.

For example, the reception coil 310 may be disposed to be continuously spaced apart from the transmission coil 240 within a certain distance during the rotation of the drum 124, or the reception coil 310 may be disposed to be spaced apart from the transmission coil 240 within a certain distance in a partial section during the rotation of the drum 124.

The reception coil 310 may be formed in an arc shape and disposed in a portion of the edge of one side of the drum 124, or may be formed in a ring shape and disposed in the entire edge of one side of the drum 124.

When the reception coil 310 is disposed in the entire edge of the tub 122 in the form of a ring, there is an advantage of transmitting power in the entire section during the rotation of the drum 124, but if the washing force reinforcing unit 40 does not continuously consume power, there is a problem that the manufacturing cost is increased.

Therefore, it is preferable that the reception coil 310 is disposed in an arc shape on a part of the edge of one side of the drum 124.

Specifically, the reception coil 310 may be disposed in the front drum cover 124b or the rear drum cover 124c. The reception coil 310 is preferably disposed around the drum hole 129 which is an edge of the front side of the drum 124.

In the present embodiment, the reception coil 310 is disposed in the front drum cover 124b. The reception coil 310 may be preferably disposed in a part of the guide rail 125 disposed in the front edge of the drum 124.

When the transmission coil 240 is disposed in the front tub cover 122b, the reception coil 310 may be disposed in the front drum cover 124b, and when the transmission coil 240 is disposed in the rear tub cover 122c, the reception coil 310 may be disposed on the rear drum cover 124c so that when the drum 124 rotates, at least portion of the transmission coil 240 and the reception coil 310 is overlapped in one direction (rotation shaft direction), and the transmission coil 240 and the reception coil 310 are adjacent to each other to transmit power.

Figure 6:
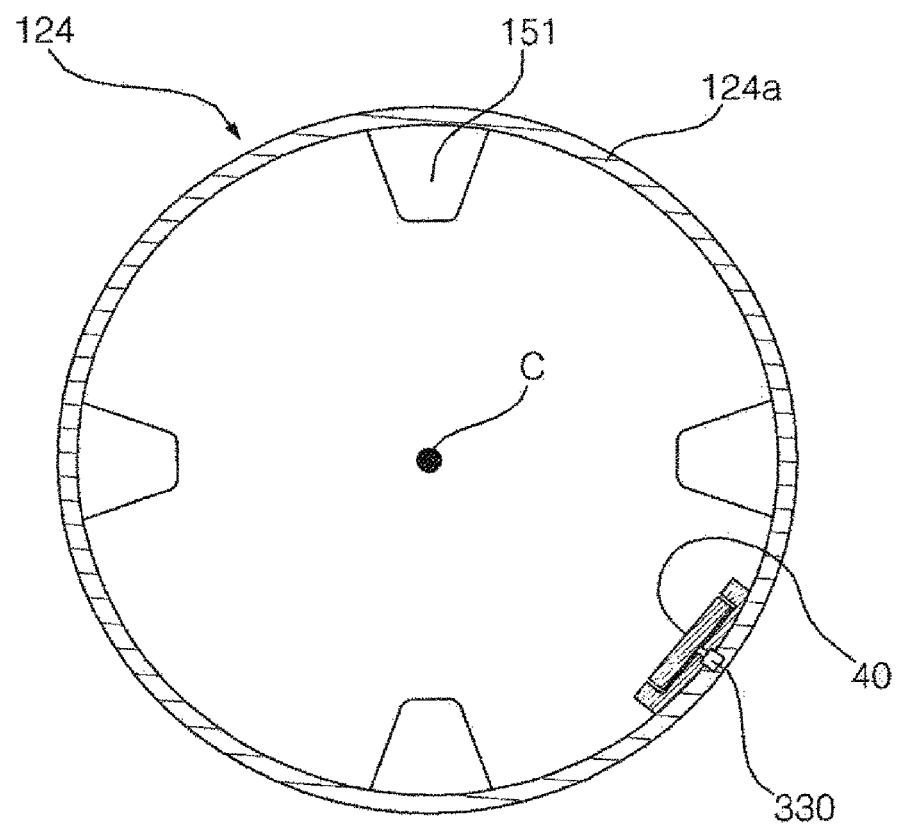
FIG. 6 is a cross-sectional view of a drum of the washing machine shown in FIG. 1.
Figure 7:
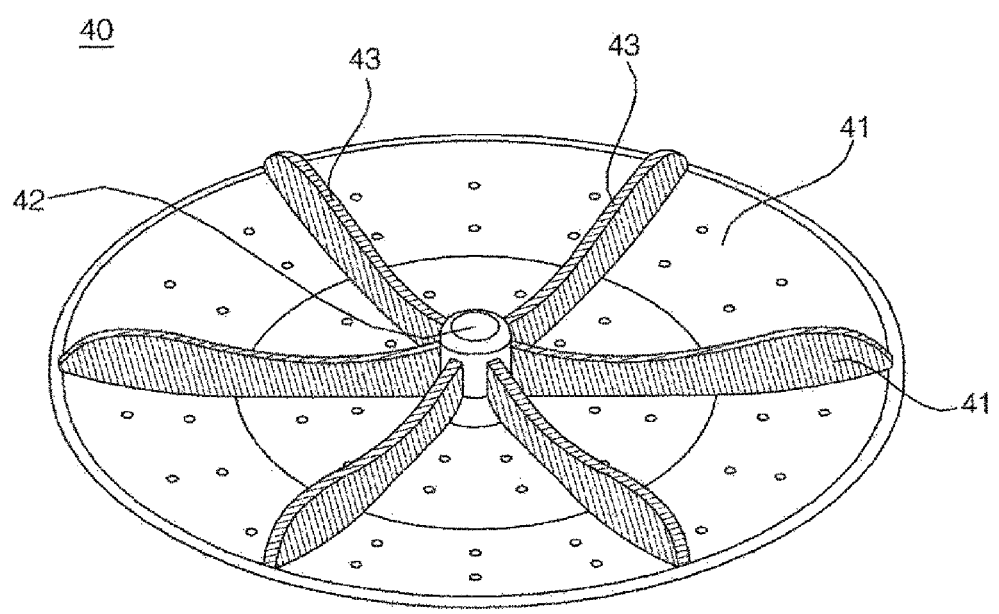
FIG. 7 is a perspective view according to an embodiment of a washing force reinforcing unit shown in FIG. 6.

FIG. 6 is a cross-sectional view of a drum of the washing machine shown in FIG. 1, and FIG. 7 is a perspective view according to an embodiment of a washing force reinforcing unit shown in FIG. 6.

The washing force enhancing unit 40 is operated by the power delivered from the reception coil 310 or/and the condenser 322 to provide physical washing force to the laundry in the drum 124. The washing force reinforcing unit 40 reinforces the washing force of the drum type washing machine.

The washing force reinforcing unit 40 is disposed in the drum 124. It is preferable that at least a portion of the washing force reinforcing unit 40 is disposed to be exposed inside the drum 124. The washing force reinforcing unit 40 may be disposed in the circumferential surface of the drum 124 or in the rear cover of the drum 124. In order to provide washing force to the cloth dropped by the lifter 151 of the drum 124, the washing force reinforcing unit 40 is preferably disposed in the inner circumferential surface of the drum body 124a. More specifically, the washing force reinforcing unit 40 is disposed between the lifters 151 on the inner circumferential surface of the drum body 124a.

For example, the washing force reinforcing unit 40 may be rotated by the power supplied from the reception coil 310 to form a water flow inside the drum 124 or to provide frictional force to the cloth inside the drum 124.

In the embodiment, the washing force reinforcing unit 40 includes a rotating plate 41 rotated with a rotation shaft intersecting with the rotation shaft of the drum 124, a plurality of protruding parts protruded from the rotating plate 41, and a drive unit 330 which provides a rotational force to the rotating plate 41.

The rotating plate 41 as a washing plate may be disposed in the circumferential surface (drum body 124a) of the drum 124.

The protruding part may include a central protrusion 42 protruded from the center of the rotating plate 41 and a plurality of peripheral protrusions 43 protruded upward from the upper surface of the rotating plate 41. The plurality of peripheral protrusions 43 are spaced apart at intervals in the circumferential direction, one end of the peripheral protrusion 43 is connected to the central protrusion 42, and the other end of the peripheral protrusion 43 is extend toward the outer peripheral portion of the rotating plate 41. At this time, the peripheral protrusion 43 is formed to be bent in the vertical direction, thereby forming a water flow by rotating the washing water flowing into the drum 124 in the forward/reverse direction. The washing force reinforcing unit 40 receives power from the drive unit 330.

Although not shown in the drawing, as another example, the washing force reinforcing unit 40 may have a structure in which an external force is applied in the direction of the central shaft of the drum 124 on the circumferential surface of the drum 124. Specifically, the washing force reinforcing unit 40 may have a structure in which a laundry rod reciprocates in the center direction from the circumferential surface of the drum 124.

As another example, the washing force reinforcing unit 40 may include a vibrator disposed and vibrated in the circumferential surface of the drum 124. The vibrator may apply a vibration force to the cloth which is lifted by the lifter 151 and dropped. The vibrator may have a known structure.

Figure 8:
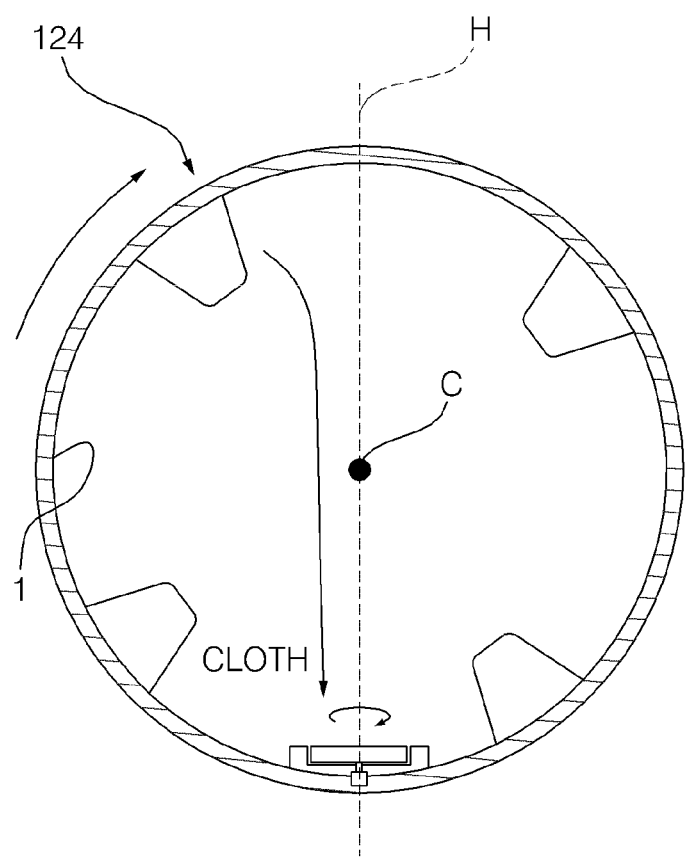
FIG. 8 is an exemplary view illustrating the operation of a washing force reinforcing unit when a drum of the washing machine shown in FIG. 1 rotates.

FIG. 8 is an exemplary view illustrating the operation of a washing force reinforcing unit when a drum of the washing machine shown in FIG. 1 rotates.

Referring to FIG. 8, a cloth is lifted into the drum 124 by the lifter 151 due to the rotation of the drum 124, and falls to the lower area of the drum 124. At this time, when the washing force reinforcing unit 40 positioned in the lower area of the drum 124 is operated, there is an advantage of increasing the washing force and saving energy.

When the washing force reinforcing unit 40 is positioned below the drum 124 when the drum 124 is rotated, as a method for temporarily operating the washing force reinforcing unit 40, a controller (not shown) may detect the position of the washing force reinforcing unit 40 and control the washing force reinforcing unit 40. However, such a method increases a load for a separate sensor and the controller, which is difficult to manufacture.

In the embodiment, when the washing force reinforcing unit 40 is positioned below the drum 124 during rotation of the drum 124, as a method for temporarily operating the washing force reinforcing unit 40, the washing force reinforcing unit 40 is operated when at least portion of the transmission coil 240 and the reception coil 310 is overlapped in one direction during rotation of the drum 124.

That is, the washing force reinforcing unit 40 is operated when the power is supplied from the reception coil. When the transmission coil 240 is disposed in an arc shape on a portion of the front edge of the tub 122, and when the reception coil 310 is disposed in an arc shape on a portion of the front edge of the drum 124, the washing force reinforcing unit 40 is operated only while the transmission coil 240 and the reception coil 310 approach within a certain distance during the rotation of the drum 124, thereby requiring no separate control.

In addition, the washing force reinforcing unit 40 is disposed in the lower area of the drum 124, when at least portion of the transmission coil 240 and the reception coil 310 is overlapped in one direction during the rotation of the drum 124. Therefore, the laundry falling down from the lifter 151 is washed once again by the washing force reinforcing unit 40 positioned in the lower area of the drum 124, and even if only a single washing force reinforcing unit 40 is used, efficient operation can be performed.

Specifically, the transmission coil 240 is disposed in the lower area of the tub 122, and the washing force reinforcing unit 40 and the reception coil 310 may be disposed to be overlapped with each other when viewed in the direction of the rotation shaft.

MODE FOR IMPLEMENTATION OF INVENTION

Figure 9:
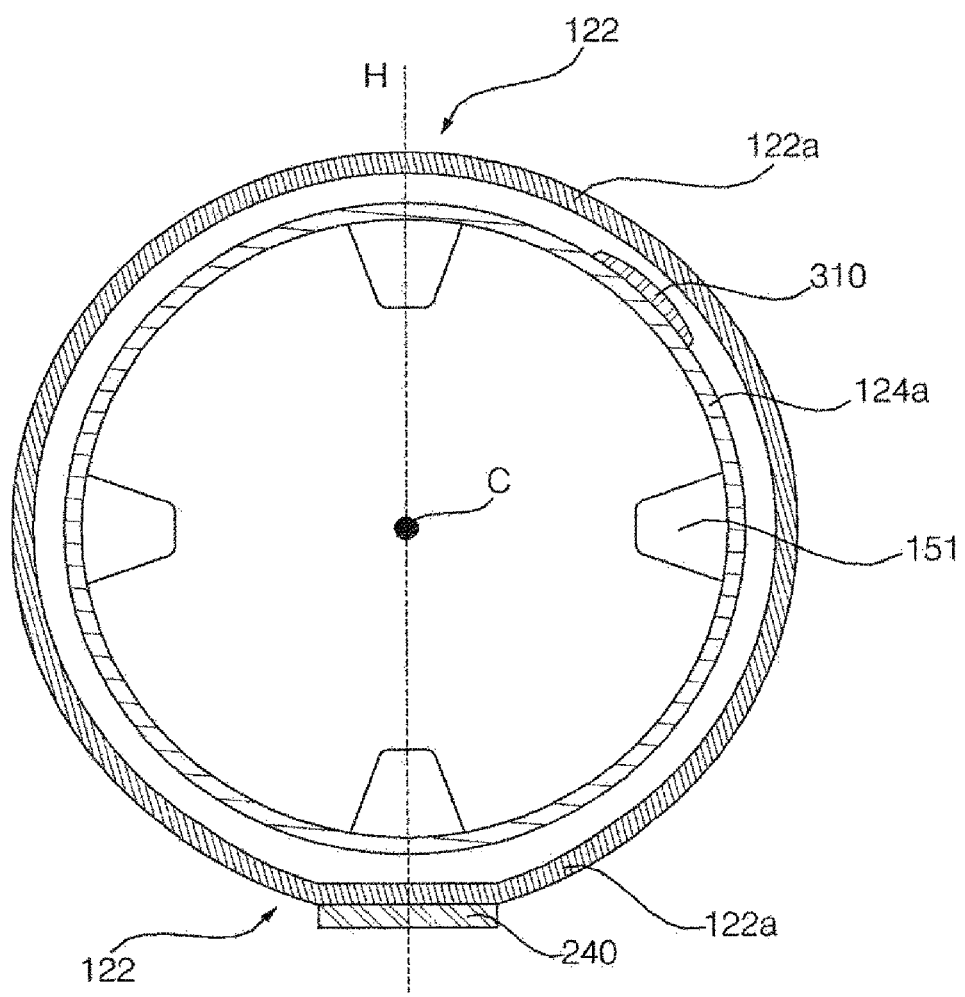
FIG. 9 is a cross-sectional view of a washing machine according to another embodiment of the present invention.

FIG. 9 is a cross-sectional view of a washing machine according to another embodiment of the present invention.

Referring to FIG. 9, in the washing machine according to another embodiment, there is a difference in the positions of the transmission coil 240 and/or the reception coil 310 in comparison with the embodiments of FIGS. 1 to 8. Hereinafter, the difference from the embodiments of FIGS. 1 to 8 will be mainly described, and other description is the same as the embodiment of FIGS. 1 to 8.

In another embodiment, the transmission coil 240 is disposed in the circumferential surface of the tub 122, and the reception coil 310 is disposed in the circumferential surface of the drum 124. Specifically, the transmission coil 240 is disposed in the tub body 122a, and the reception coil 310 is disposed in the drum body 124a. Preferably, the transmission coil 240 is disposed in the outer surface of the tub body 122a, and the reception coil 310 is disposed in the outer surface of the drum body 124a.

Figure 10:
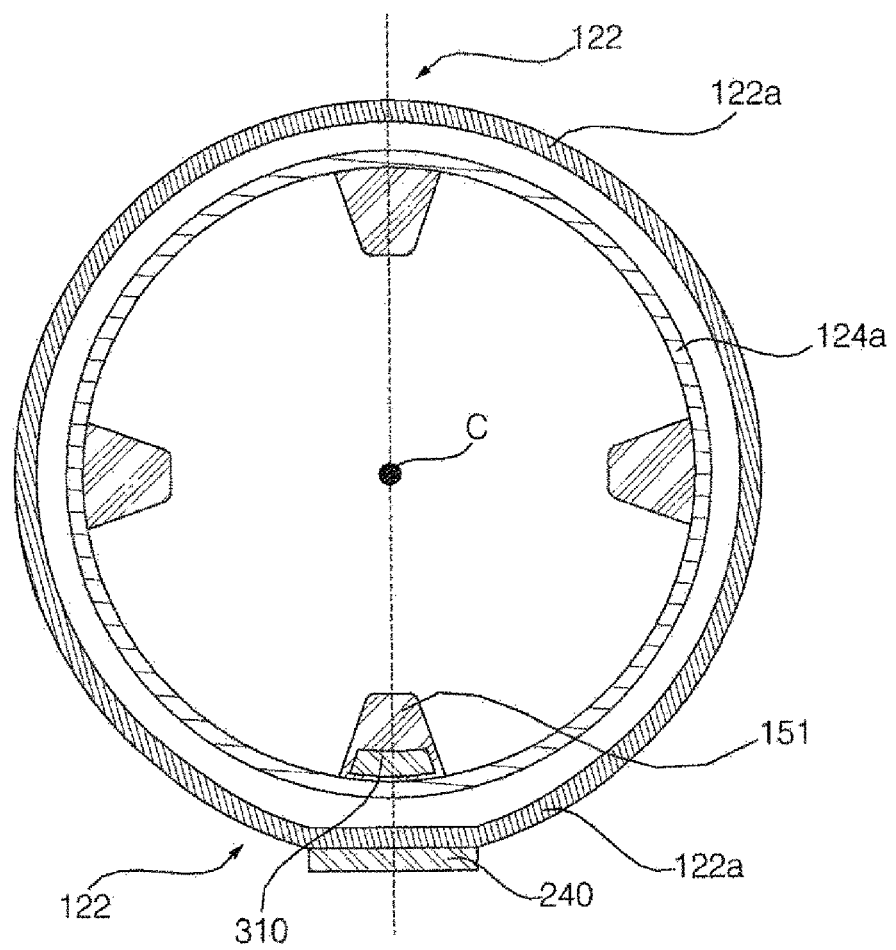
FIG. 10 is a cross-sectional view of a washing machine according to another embodiment of the present invention.

FIG. 10 is a cross-sectional view of a washing machine according to another embodiment of the present invention.

Referring to FIG. 10, in comparison with to the embodiment of FIGS. 1 to 8, the washing machine according to another embodiment has a difference in the positions of the transmission coil 240 and/or the reception coil 310.

The reception coil 310 of another embodiment is positioned in the lifter 151 of the drum 124. When the reception coil 310 is embedded in the lifter 151, a space in which the reception coil 310 is disposed may not be separately provided, and the lifter 151 may have a waterproof function.

At this time, the transmission coil 240 is disposed in the inner surface of the tub body 122a, and may maintain a separation distance with the reception coil 310 embedded in the lifter 151 at an appropriate distance.

Figure 11:
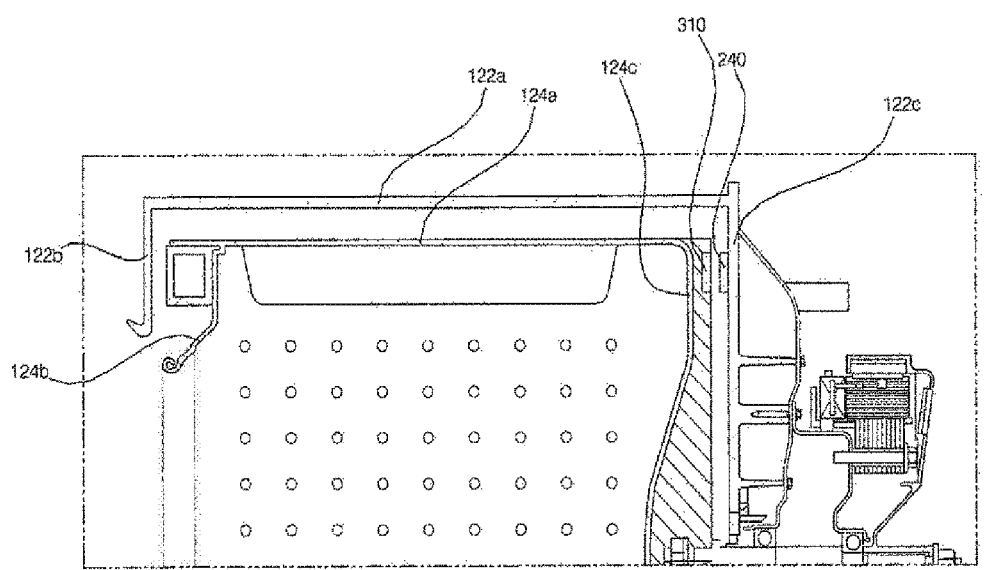
FIG. 11 is a cross-sectional view of a washing machine according to another embodiment of the present invention.

FIG. 11 is a cross-sectional view of a washing machine according to another embodiment of the present invention.

Referring to FIG. 10, in the washing machine according to another embodiment, there is a difference in the position of the transmission coil 240 and/or the reception coil 310 in comparison with the embodiments of FIGS. 1 to 8.

The transmission coil 240 of another embodiment is disposed in an arc shape in a portion of the rear edge of the tub 122. Specifically, the transmission coil 240 may be disposed in the inner surface or the outer surface of the rear tub cover 122c. For waterproofing, the transmission coil 240 is preferably disposed in the upper area of the tub 122.

The reception coil 310 is disposed in an arc shape in a portion of the rear edge of the drum 124. Specifically, the reception coil 310 may be disposed in the rear drum cover 124c.

Figure 12:
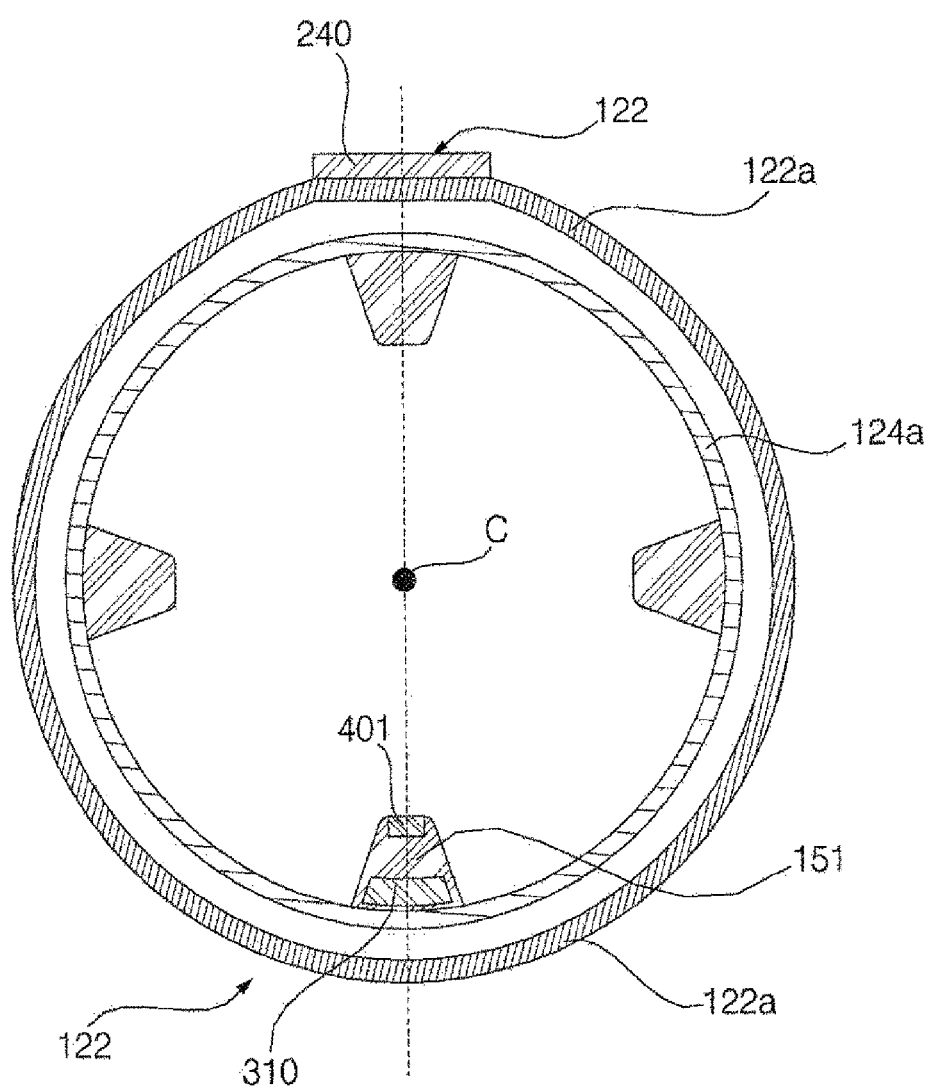
FIG. 12 is a cross-sectional view of a drum according to another embodiment of the present invention.

FIG. 12 is a cross-sectional view of a drum according to another embodiment of the present invention.

Referring to FIG. 12, there is a difference that a washing machine according to another embodiment further includes a light source 401, in comparison with the embodiment of FIG. 10.

The light source 401 is operated by the power transmitted from the reception coil and supplies light to the inside of the drum 124. The light source 401 emits light for a user to visually recognize the inside of the drum 124.

The light source 401 supplies light of at least one wavelength band among ultraviolet light and visible light to the inside of the drum 124 to sterilize the laundry contained in the drum 124, and to allow a user to visually recognize the inside of the drum 124.

The light source 401 may have a structure for emitting ultraviolet or visible light by electrical energy. For example, the light source 401 may include a light emitting diode. The light emitting diode has an advantage of easily control color and dimming.

Specifically, the light source 401 may include at least two of a group of light emitting device including a UV light emitting device for emitting light of a ultraviolet wavelength, a red light emitting device for emitting light of a red wavelength, a green light emitting device for emitting light of a green wavelength, and a blue light emitting device 424 for emitting light of a blue wavelength.

The light source 401 is positioned inside the lifter 151 of the drum 124. When the light source 401 is embedded in the lifter 151, a space where the light source 401 is disposed may not be separately provided, and the lifter 151 has an advantage of a waterproof, and an advantage of easily accomplishing electrical connection with the reception coil 310. At this time, the light source 401 is disposed to extend in the longitudinal direction of the lifter 151.

More specifically, the light source 401 may include a UV light emitting device, a red light emitting device, and a green light emitting device, may include a UV light emitting device, a red light emitting device, and a blue light emitting device 424, may include a UV light emitting device, a blue light emitting device 424, and a green light emitting device, may include a UV light emitting device, a red light emitting device, and a green light emitting device, or may include a UV light emitting device, a red light emitting device, a green light emitting device, and a blue light emitting device 424. The UV light emitting device serves to sterilize the laundry, and the other light emitting device serves to illuminate the inside of the drum 124.

Obviously, the light source 401 may provide a white lighting as all the plurality of light emitting devices emit white light, and may provide a lighting of a specific color or a white lighting by combining red, green, and blue light emitting devices. Conventional analog lighting has a limitation in precisely controlling illuminance, but the light emitting device can precisely control the illuminance of the light emitting device by adjusting the amount of applied current and the width of a driving pulse. In addition, when the light emitting devices of red, green, and blue colors are installed in combination, lighting of a specific color mat be provided to a specific space and adjustment of color temperature can be easily accomplished.

The on-off, dimming, and color adjustment of such one or more light emitting devices are controlled by a controller described later. The control of the light source 401 will be described later in detail with reference to FIG. 8.

The light source 401 is disposed in a position for supplying light into the drum 124. Specifically, it is disposed to extend in the front-rear direction of the drum 124 in the inner surface of the drum 124. When the light source 401 is disposed long in the front-rear direction of the drum 124, the probability that the ultraviolet light generated by the light source 401 is irradiated to the laundry during the rotation of the drum 124 is increased.

Due to rotation of the drum 124, the cloth in the drum 124 is lifted by the lifter 151 and falls to the lower area of the drum 124. At this time, since a part of the laundry and the washing water are positioned in the lower area of the drum 124, when the light source 401 is positioned in the lower area of the drum 124 and emits light, the light of the light source 401 cannot be effectively diffused inside the drum 124. In addition, there is a disadvantage in that the manufacturing cost of the reception coil 310 is increased in order to continuously operate the light source 401 when the drum 124 rotates.

Therefore, when the light source 401 is positioned in the upper area of the drum 124 during rotation of the drum 124, as a method for temporarily operating the light source 401, a controller described later may detect the position of the light source 401 and control the light source 401. However, such a method is difficult to manufacture because it increases the load on a separate sensor and the controller.

In the embodiment, when the light source 401 is positioned above the drum 124 during rotation of the drum 124, in order to temporarily operate the light source 401, the light source 401 is allowed to operate when at least portion of the transmission coil 240 and the reception coil 310 is overlapped in one direction during the rotation of the drum 124. That is, the light source 401 is operated when power is supplied from the reception coil. When the transmission coil 240 is disposed in an arc shape on a part of the front edge of the tub 122, and the reception coil 310 is disposed in an arc shape on a part of the front edge of the drum 124, the light source 401 operates only while the transmission coil 240 and the reception coil 310 approach within a certain distance during the rotation of the drum 124, so that a separate control is not necessary.

In addition, the light source 401 is disposed in the upper area of the drum 124 when at least portion of the transmission coil 240 and the reception coil 310 is overlapped in one direction during the rotation of the drum 124. Therefore, when light is emitted from the light source 401 positioned in the upper area of the drum 124, the light is irradiated to the laundry positioned in the lower area, so that user can easily check the inside of the drum 124.

In detail, the transmission coil 240 may be disposed in the upper area of the tub 122, and the light source 401 and the reception coil 310 may be disposed to overlap each other when viewed in the direction of the rotation shaft.

The washing machine according to an embodiment may further include a controller and an operation detecting unit 440.

The operation detecting unit 440 detects an operating state of the washing machine and outputs the detection result to the controller. For example, the operation detecting unit 440 may detect whether the washing machine is operated, or detect a washing step of the washing machine.

Specifically, the operation detecting unit 440 may detect that the washing machine is in a state of any one of the washing process, the rinsing process, and the dehydration process, or may detect that the washing machine is stopped, by measuring the rotation or/and the current value of a motor (not shown) providing a driving force to the tub 122 and the drum 124, or by measuring the amount of washing water in the drum 124.

The controller controls the overall operation of the washing machine, and generates a lighting control command for controlling the light source 401. The controller is connected to the light source 401 by a wireless communication method. In detail, the controller is disposed outside the tub 122, and the light source 401 is disposed inside the drum 124.

The controller receives the detection result from the operation detecting unit 440 and generates a lighting control command for controlling the light source 401. Here, the lighting control command includes at least one of operation information of blinking, color conversion, and brightness conversion of the light source 401.

For example, when the washing machine is in the washing process, the controller controls the light source 401 to emit ultraviolet rays, and controls the light source 401 to emit light of a color different from that of the ultraviolet rays when the washing process of the washing machine is finished. Accordingly, there is an advantage that a user can recognize whether the washing process proceeds while effectively sterilizing the laundry inside the drum 124.

For another example, the controller may control the light source 401 to emit light of a different color for each process of the washing machine. Accordingly, there is an advantage that user can easily recognize the washing step, and can predict a termination time, and the like.

The controller may control the light source 401 to emit ultraviolet rays for a certain time of at least one of the processes. Obviously, the controller may control the light source 401 to emit ultraviolet rays for a certain time for each process of the washing machine.

The light source 401 is based on a UV light emitting device, a red light emitting device, and a green light emitting device that are included in the light source 401.

In the washing process, firstly, washing water is supplied into the tub 122. Water supplying via the detergent box 133 and/or spraying by a spray nozzle (not shown) (hereinafter, referred to as water supplying/spraying) is performed, and the drum 124 motor 113 is stirred in both directions at a low speed and rotated, thereby releasing the tangled laundry so that the laundry is effectively wet. Thereafter, the drum 124 is controlled to be stirred in both directions alternately and be rotated.

In the washing process, the controller controls the UV light emitting device to be turned-on for at least a certain time. In addition, during the washing process, the controller controls the red light emitting device to be turned on intermittently or continuously. Therefore, since the red light is emitted through the door of the drum 124 during the washing process, user can recognize as a washing process.

In the rinsing process, the controller controls to rotate the drum 124, and controls the washing water to drain and supply water repeatedly.

In the rinsing process, the controller may control the UV light emitting device to be turned on for at least a certain time. Obviously, in the rinsing process, the controller may control the UV light emitting device to be turned off.

In addition, during the rinsing process, the controller controls the red light emitting device to be turned off and controls the green light emitting device to be turned on intermittently or continuously. Therefore, since the green light is emitted through the door of the drum 124 during the rinsing process, user can recognize as the rinsing process.

In the dehydration process, the controller controls to drain the washing water and controls the drum 124 to rotate at a high speed.

The controller controls the red light emitting device and the green light emitting device to be turned on intermittently or continuously during the dehydration process. Therefore, since the blue light is emitted through the door of the drum 124 during the dehydration process, user can recognize as the dehydration process.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims. Accordingly, the scope of the present invention is not construed as being limited to the described embodiments but is defined by the appended claims as well as equivalents thereto.

The invention claimed is:

1. A washing machine comprising:
   a tub which accommodates washing water;
   a drum which is disposed inside the tub, accommodates cloth, and is rotatable;
   a transmission coil which is disposed in the tub and supplies power wirelessly;
   a reception coil which is disposed in the drum and receives the power transmitted from the transmission coil; and
   a washing force reinforcing unit which is disposed in the drum, operated by the power delivered from the reception coil, and provides washing force to the cloth.

2. The washing machine of claim 1, further comprising a condenser which is disposed in the drum and stores the power received from the reception coil.

3. The washing machine of claim 1, wherein the transmission coil is formed in an arc shape, and is disposed in a portion of an edge of one side of the tub.

4. The washing machine of claim 1, wherein the transmission coil is formed in a ring shape, and is disposed in an edge of one side of the tub.

5. The washing machine of claim 1, further comprising a weight which is coupled to a portion of an edge of one side of the tub and applies a load,
   wherein the transmission coil is disposed in an area where the weight is not disposed among the edge of one side of the tub.

6. The washing machine of claim 1, wherein the reception coil is disposed in a corresponding position of the transmission coil.

7. The washing machine of claim 1, wherein the washing force reinforcing unit is operated, when at least a portion of the transmission coil and the reception coil is overlapped in one direction during rotation of the drum.

8. The washing machine of claim 7, wherein the washing force reinforcing unit is positioned in a lower area of the drum, when at least a portion of the transmission coil and the reception coil is overlapped in one direction during rotation of the drum.

9. The washing machine of claim 1, wherein the washing force reinforcing unit comprises:
   a rotating plate rotated with a rotation shaft intersecting with the rotation shaft of the drum; and
   a plurality of protruding parts protruded from the rotating plate.

10. The washing machine of claim 1, wherein the washing force reinforcing unit is disposed in a circumferential surface of the drum.

11. The washing machine of claim 1, wherein the washing force reinforcing unit applies an external force in a direction of a central shaft of the drum from a circumferential surface of the drum.

12. The washing machine of claim 1, wherein the washing force reinforcing unit is a vibrator which is disposed in a circumferential surface of the drum and is vibrated.

13. A washing machine comprising:
   a tub which accommodates washing water;
   a drum which is disposed inside the tub, accommodates cloth, and is rotatable;
   a transmission coil which is disposed outside the tub and supplies power wirelessly;
   a reception coil which is disposed in the drum and receives the power transmitted from the transmission coil; and
   a washing force reinforcing unit which is disposed in the drum, operated by the power delivered from the reception coil, and provides washing force to the cloth.

14. The washing machine of claim 13, wherein the transmission coil is disposed in an outer surface of the tub.

15. The washing machine of claim 13, wherein the reception coil is disposed in a circumferential surface of the drum.

* * * * *